United States Patent [19]
Fox

[11] Patent Number: 5,125,598
[45] Date of Patent: Jun. 30, 1992

[54] PIVOTING ENERGY ATTENUATING SEAT

[75] Inventor: Roy G. Fox, Weatherford, Tex.

[73] Assignee: Bell Helicopter Textron Inc., Fort Worth, Tex.

[21] Appl. No.: 443,761

[22] Filed: Dec. 7, 1989

[51] Int. Cl.$^5$ .......................................... B64D 25/04
[52] U.S. Cl. .............................. 244/122 R; 297/216; 280/806
[58] Field of Search ....... 244/122 R, 120 AG, 122 R, 244/121; 296/65 R, 65 A, 68; 297/216; 280/806, 805

[56] References Cited

U.S. PATENT DOCUMENTS

| | | | |
|---|---|---|---|
| 2,736,566 | 2/1956 | Hartl | 297/216 |
| 3,420,475 | 1/1969 | Castillo et al. | 244/122 R |
| 4,154,472 | 5/1979 | Bryll | 296/65 |
| 4,257,626 | 3/1981 | Adomeit | 297/216 |
| 4,408,738 | 10/1983 | Mazelsky | 244/122 R |
| 4,423,848 | 1/1984 | Mazelsky | 244/122 R |
| 4,474,347 | 10/1984 | Hazelsky | 244/122 R |
| 4,523,730 | 6/1985 | Martin | 244/122 R |
| 4,525,010 | 6/1985 | Trickey et al. | 297/216 |
| 4,655,416 | 4/1987 | Carnell et al. | 244/121 |
| 4,720,139 | 1/1988 | McSmith | 297/216 |

FOREIGN PATENT DOCUMENTS 565702 3/1958 Belgium ........................ 296/68.1

Primary Examiner—Galen Barefoot
Attorney, Agent, or Firm—Ross, Howison, Clapp & Korn

[57] ABSTRACT

An energy attenuating seat for a vehicle includes a seat member having a seat back and a seat pan. The seat pan includes a front and rear portion. The seat back is rigidly attached to a rigid seat structure or directly to the vehicle. Support structure is provided which is rigidly attached to the vehicle and which is disposed adjacent to the front portion of the seat pan for supporting the seat pan front portion. Structure is provided for hingedly interconnecting the seat pan front portion and the support structure, such that the seat pan rotates about this interconnection. An energy attenuator is interconnected between the seat back and the rear portion of the seat pan, such that vertical load forces experienced by an occupant of the vehicle during a crash causes the seat pan to pivot downwardly whereby the rear portion of the seat pan is disposed closer to the vehicle floor than the seat pan front portion. A vertical height adjustment is provided by allowing the seat to pivot upward and downward.

10 Claims, 1 Drawing Sheet

PIVOTING ENERGY ATTENUATING SEAT

This invention was made with Government support under Contract No. DAMD17-87-C-7032 awarded by Department of the Army, U.S. Army Medical Research Acquisition Activity. The Government has certain rights in this invention.

TECHNICAL FIELD OF THE INVENTION

The present invention relates to crashworthy seats for use in aircraft, and more particularly to a pivoting energy attenuating seat for use in helicopters.

BACKGROUND OF THE INVENTION

The increased military and civilian use of helicopters has resulted in a need for improved safety devices to insure the safety of occupants during crash conditions. Occupant protection and survival under crash conditions is of primary importance in helicopter design. Adequate protection requires that crash forces and decelerations transmitted to the occupant through the helicopter structure are limited to within human tolerance levels. When vertical loads from a crash impact exceed human injury tolerance, severe back injury can occur. Seats have been designed with various different forms of integral energy absorbing structure which allows the occupant of a seat to stroke downwards in a controlled manner thereby reducing the magnitude of deceleration that is experienced, while increasing its duration.

Conventionally, aircraft seats have been designed for mounting on a floor, a bulkhead, or directly on aircraft structure. Floor warpage or bulkhead buckling during a crash landing can adversely affect the correct operation of the seat.

Energy attenuating seats, also referred to as energy absorbing seats, have been proposed in which the seat limits the vertical crash loads experienced by the occupant to within human injury tolerance levels. The vertical crash loads are limited by allowing the seat motion or stroke to be load limited by an energy attenuator or energy absorbing device. Existing energy attenuating seats require a cleared volume from underneath the entire stroking seat pan where the seat will move during the stroke. The area under the seat pan must not contain any rigid structure or other obstructions that could interfere with the seat motion in a crash. The seat bottom to seat back relative angle remains basically constant during the stroking. Therefore a large volume of otherwise usable space under the seat must be dedicated and preserved to use present energy attenuating seats. Furthermore, such seats cannot be used where the seat bottom is mounted directly on the vehicle structure.

A need has thus arisen for an energy attenuating seat which will provide energy attenuation where the seat is mounted directly on the aircraft structure or where an entire cleared space under the seat is not practical. A need has further arisen for an energy attenuating seat which reduces the potential for occupant submarining out from under a lap seat belt, and which further provides for vertical seat adjustment.

SUMMARY OF THE INVENTION

In accordance with the present invention, an energy attenuating seat for a vehicle is provided. The seat includes a seat member having a seat back and a seat pan. The seat pan includes a front and rear portion. The seat back is rigidly attached to the vehicle either as an integral part of the vehicle structure or as part of a rigidly mounted seat. Support structure is provided which is rigidly attached to the vehicle and which is disposed adjacent to the front portion of the seat pan for supporting the seat pan front portion. Structure is provided for hingedly interconnecting the seat pan front portion and the support structure, such that the seat pan rotates about this interconnection. An energy attenuator is interconnected between the seat back and the rear portion of the seat pan, such that vertical load forces experienced by an occupant of the vehicle during a crash causes the seat pan to pivot downwardly whereby the rear portion of the seat pan is disposed closer to the vehicle floor than the seat pan front portion. If desired, a vertical adjustment device can be mounted between the energy attenuator and the rear portion of the seat pan which can be activated by the occupant to allow the seat pan to pivot upward or downward, thus providing vertical seat height adjustment.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
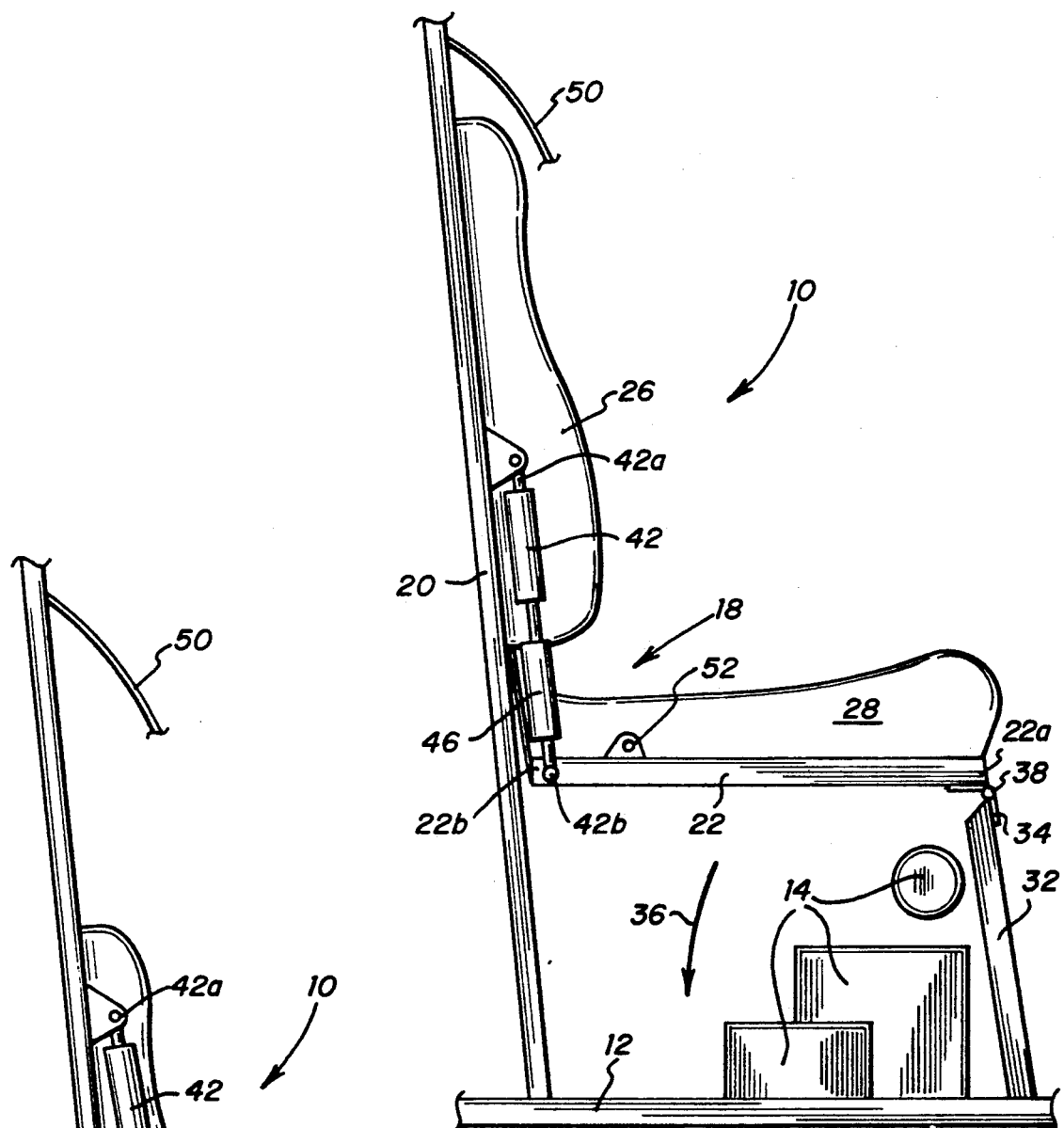
FIG. 1 is a side elevational view of the present energy attenuating seat during normal use, prior to a crash.
Figure 2:
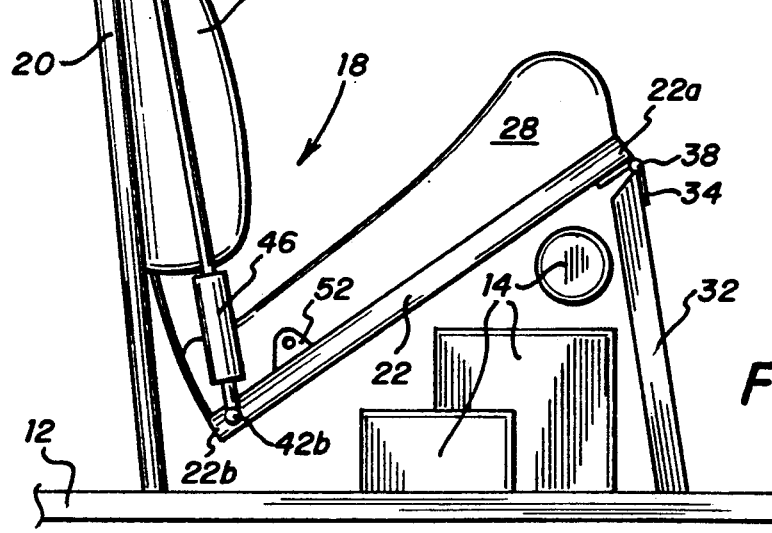
FIG. 2 is a side elevational view of the present energy attenuating seat illustrating the seat motion in a crash condition.

Referring simultaneously to FIGS. 1 and 2, the present energy attenuating seat is illustrated, and is generally identified by the numeral 10. Energy attenuating seat 10 may be utilized in any type of vehicle, such as, for example, aircraft including helicopters; however, the present invention is not limited to any particular type of vehicle. Energy attenuating seat 10, in an aircraft environment, may be positioned on a floor 12, over aircraft structure, flight controls, or other obstructions, generally identified by the numeral 14.

Energy attenuating seat 10 includes a seat member, generally identified by the numeral 18 including a seat back 20 and a seat pan 22 having a front portion 22a and a rear portion 22b. Seat back 20 and seat pan 22 are disposed generally perpendicular to each other, such that seat pan 22 is generally disposed horizontally. Seat back 20 is rigidly interconnected to the vehicle or aircraft. Seat back 20 includes a seat back cushion 26, and seat pan 22 includes a seat cushion 28.

Disposed below front portion 22a of seat pan 22 is a support structure 32 which is rigidly interconnected to floor 12 of the vehicle or aircraft utilizing the present energy attenuating seat 10. Seat pan 22 and support structure 32 are hingedly interconnected utilizing a hinge 34 which allows seat pan 22 to pivot in the direction of arrow 36 (FIG. 1) about a rotation axis 38.

Rear portion 22b of seat pan 22 is interconnected to seat back 20 utilizing an energy attenuating device 42. Energy attenuating device 42 is pivotally interconnected at ends 42a and 42b to seat back 20 and seat pan 22, respectively. Interconnected between the energy attenuating device 42 and seat pan 22 rear portion 22b is a vertical seat height adjuster 46.

Energy attenuating seat 10 further includes a shoulder harness 50 and a lap belt attachment 52 for securing a seat belt for use by the occupant by the vehicle or aircraft.

As more clearly shown in FIG. 2, during a crash condition, seat pan 22 pivots about rotation axis 38 in the direction of arrow 36 such that the majority of horizontal and lateral seat loading is reacted at the rotation axis 38 into support structure 32. The rear portion 22b of seat pan of 22 is restrained vertically by energy attenuating device 42. The vertical component of the crash load is shared between the structure 32 and energy attenuating device 42. When the vertical component of the crash load reaches the energy attenuating device 42 stroking load, the rear portion 22b of seat pan 22 will begin to move downwardly in its energy attenuating stroke. Energy attenuating device 42 limits the crash loads transferred to seat pan 22.

The relative motion of seat pan 22 is in an arc pivoting about rotation axis 38 rather than a translational motion. Since front portion of 22a of seat pan 22 remains in the same location during stroking, structure 14 can be mounted in the unused area under seat pan 22 and therefore the volume required to be vacant under seat pan 22 is significantly reduced. The present energy attenuating seat 10 further reduces the potential for occupant submarining. The forward crash load component on the occupant in previously existing crashworthy seats may pull the occupant's legs and subsequently the torso out from under a lap belt. Utilizing the present energy attenuating seat 10, because seat pan 22 pivots down during stroking, the pitch angle of seat pan 22 is increasing during stroking. Thus, after pivoting starts to occur, the crash loading will drive the occupant into the seat pan 22 and reduce the potential for submarining. The greater the pivot angle of seat pan 22, the greater the reduction in submarining.

As illustrated in FIG. 2, seat back cushion 26 translates along seat back 20 during a crash condition. Seat back cushion 26 may be attached to seat cushion 28 or seat back cushion 26 may be attached directly to seat pan 22 to accomplish this motion. Energy attenuating device 42 may comprise, for example, a tension, compression or rotation device which operation is well known to those skilled in the art.

It therefore can be seen that the present invention provides for a pivoting energy attenuating seat in which the vertical component of the crash load forces on an occupant causes the seat pan to pivot downwardly and by attenuating crash forces into energy attenuating devices and aircraft structure.

Whereas the present invention has been described with respect to specific embodiments thereof, it will be understood that various changes and modification will be suggested to one skilled in the art and it is intended to encompass such changes and modifications as fall within the scope of the appended claims.

I claim:

1. An energy attenuating seat for a vehicle comprising:
   a seat member including a seat back and a seat pan having a front and rear portion;
   support means rigidly attached to the vehicle and disposed adjacent said front portion of said seat pan for supporting said seat pan front portion;
   means for hingedly interconnecting said seat pan front portion and said support means, such that said seat pan rotates about said interconnection; and
   energy attenuating means interconnected between said seat back and said rear portion of said seat pan, and pivotally interconnected to said seat back, such that vertical load forces experienced by an occupant of the vehicle during a crash causes said seat pan to pivot downwardly whereby said rear portion of said seat pan is disposed closer to the vehicle floor than said seat pan front portion during a crash.

2. The seat of claim 1 wherein said energy attenuating means is pivotally interconnected to said rear portion of said seat pan.

3. The seat of claim 1 wherein said seat pan includes means for attaching a seat belt for restraining the occupant of the vehicle in the seat.

4. The seat of claim 1 wherein said seat back includes means for restraining the occupant of the vehicle in the seat.

5. An energy attenuating seat for a vehicle comprising:
   a seat member including a seat back and a seat pan having a front and rear portion;
   support means rigidly attached to the vehicle and disposed adjacent said front portion of said seat pan for supporting said seat pan front portion;
   means for hingedly interconnecting said seat pan front portion and said support means, such that said seat pan rotates about said interconnection; and
   energy attenuating means interconnected between said seat back and said rear portion of said seat pan, and pivotally interconnected to said rear portion of said seat pan, such that vertical load forces experienced by an occupant of the vehicle during a crash causes said seat pan to pivot downwardly whereby said rear portion of said seat pan is disposed closer to the vehicle floor than said seat pan front portion during a crash.

6. The seat of claim 5 wherein said energy attenuating means if pivotally interconnected to said seat back.

7. The seat of claim 5 wherein said seat pan includes means for attaching a seat belt for restraining the occupant of the vehicle in the seat.

8. The seat of claim 5 wherein said seat back includes means for restraining the occupant of the vehicle in the seat.

9. An energy attenuating seat for an aircraft having flight controls, aircraft or rigid seat structure, and the like disposed under the seat, the energy attenuating seat comprising:
   a seat member including a vertically disposed seat back and a horizontally disposed seat pan having a front and rear portion, said seat back being rigidly attached to the aircraft structure, said front portion of said seat pan being disposed above the flight controls, aircraft structure and the like of the aircraft;
   support means rigidly attached to the helicopter and disposed adjacent to said front portion of said seat pan for supporting said seat pan front portion;
   means for hingedly interconnecting said seat pan front portion and said support means, such that said seat pan rotates about said interconnection; and
   energy attenuating means pivotally interconnected to said seat back and to said rear portion of said seat pan, such that vertical load forces experienced by an occupant of the aircraft during a crash causes said seat pan to pivot downwardly whereby said rear portion of said seat pan is disposed closer to the helicopter floor than said seat pan front portion during a crash.

10. The seat of claim 9 and further including:
    means for adjusting the vertical position of said seat pan by varying the rotational angle of said seat pan.

* * * * *